Patented Sept. 16, 1941

2,256,152

UNITED STATES PATENT OFFICE 2,256,152

STYRENE COPOLYMERS

Howard S. Nutting and Peter S. Petrie, Midland, Mich., assignors to The Dow Chemical Company, Midland, Mich., a corporation of Michigan No Drawing. Application October 10, 1939, Serial No. 298,848

2 Claims. (Cl. 260—73)

This invention relates to the co-polymers of vinyl aromatic compounds, particularly styrene, with 2-methyl acrolein.

We have found that 2-methyl acrolein

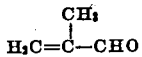

can be co-polymerized with styrene or other polymerizable vinyl aromatic compounds to form resinous products which are useful in the fabrication of molded objects and in the formulation of coating compositions.

The 2-methyl acrolein and vinyl aromatic compound can be co-polymerized in any desired proportion from nearly pure vinyl aromatic compound to nearly pure 2-methyl acrolein. In practice, the vinyl aromatic compound, e. g. styrene, parachloro styrene, ortho-methyl styrene, vinyl naphthalene, etc., and the 2-methyl acrolein are mixed in the proportion desired and the mixture is heated at an elevated temperature, preferably 50°–125° C. until polymerization is complete, usually in three days or less, although longer times are sometimes required, especially in the case of those mixtures containing the vinyl compound and 2-methyl acrolein in approximately equal proportions. Polymerization may also be effected by allowing the mixture to stand for several weeks at room temperature or by heating at other temperatures outside the preferred range stated. The polymerization is accelerated by oxygen from the air, and at temperatures above 50° C. is catalyzed by peroxides. Polymerization with stannic chloride as catalyst results in the formation of viscous liquid and rubber-like products. If desired, dyes, pigments, plasticizers, etc. may be incorporated into the co-polymers either by carrying out the polymerization in the presence of such materials or by mixing these with the co-polymer by mechanical working.

The properties of the co-polymer depend to a marked degree upon the proportion of 2-methyl acrolein present. Thus the co-polymer of styrene with 0.1–5.0 per cent of 2-methyl acrolein is a clear resinous solid resembling polystyrene in appearance. It is harder than the latter and less soluble in common organic solvents, and is particularly useful as a molding resin and as a base for coating compositions. Complete polymerization of styrene with higher percentages of 2-methyl acrolein yields a hard resin substantially insoluble in common solvents. When the mixture polymerized is predominantly 2-methyl acrolein, the polymer is an opaque white mass. In general, the co-polymers containing higher percentages of 2-methyl acrolein are harder, less soluble, and of lower molecular weight than the lower per cent co-polymers.

The following examples will illustrate the invention but are not to be construed as limiting its scope.

Example 1

Mixtures of styrene and 2-methyl acrolein in the proportions shown in Table I were heated together at 110° C. for the periods indicated. The density of each product was observed; the hardness was measured on a Shore durometer D; and the molecular weight was determined by the Staudinger method (Ber. 63, 222 (1930)). The results are given in Table I.

Table I

| Percent 2-methyl acrolein | Time of heating | Appearance | Density | Molecular weight | Shore hardness |
|---|---|---|---|---|---|
| | Hours | | | | |
| 0 | 20 | Clear | 1.057 | 70,300 | 85 |
| 1 | 20 | ....do | 1.058 | 70,120 | 87 |
| 5 | 20 | Slightly milky | 1.063 | 51,290 | 89 |
| 10 | 20 | Milky | 1.068 | 37,000 | 90 |
| 0 | 65 | Clear | 1.061 | 143,500 | 87 |
| 1 | 65 | ....do | 1.065 | 106,620 | 87 |
| 5 | 65 | Slightly milky | 1.063 | 82,760 | 87 |
| 10 | 65 | Milky | 1.072 | 56,860 | 88 |

Example 2

Styrene 2-methyl acrolein co-polymers were prepared by allowing mixtures of styrene and 1, 3, 5, 7 and 10 per cent by weight of 2-methyl acrolein to stand at a temperature of 20°–25° C. for several months. The products were tested chemically for the presence of aldehydes and in each case reacted negatively. Small portions of the products were tested for solubility by agitating with benzene for eight hours. The 1, 3 and 5 per cent co-polymers dissolved almost completely, forming solutions from which resinous films could be deposited. The 7 per cent resin dissolved only slightly, and the 10 per cent co-polymer was substantially insoluble but swelled markedly.

Example 3

A mixture of equal weights of styrene and 2-methyl acrolein was heated at 60° C. for 19 days. The resin formed was a hard solid insoluble in benzene.

Example 4

Mixtures of styrene and 2-methyl acrolein containing 90, 93, and 95 per cent by weight of the latter were heated at 60° C. for four days. The products so obtained were hard, white, brittle resins.

Other modes of employing the principle of the invention may be employed instead of those explained, change being made as regards the details described, provided the product or method stated in any of the following claims or the equivalent thereof be employed.

We claim:

1. As a new synthetic resin, the product of the conjoint polymerization of styrene and between about 0.1 and about 5.0 per cent by weight of 2-methyl acrolein, being a clear, hard, resinous solid.

2. A method which comprises heating a mixture of styrene and between about 0.1 and about 5.0 per cent of 2-methyl acrolein at a temperature between about 50° C. and 125° C. until polymerization is substantially complete.

HOWARD S. NUTTING.
PETER S. PETRIE.